(12) United States Patent
Van Wageningen et al.

(10) Patent No.: US 12,192,834 B2
(45) Date of Patent: Jan. 7, 2025

(54) SECURE HANDOVER IN A LIFI NETWORK

(71) Applicant: SIGNIFY HOLDING B.V., Eindhoven (NL)

(72) Inventors: Andries Van Wageningen, Wijlre (NL); Piotr Polak, Eindhoven (NL); Sahil Sharma, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 317 days.

(21) Appl. No.: 17/796,664

(22) PCT Filed: Feb. 15, 2021

(86) PCT No.: PCT/EP2021/053645
§ 371 (c)(1),
(2) Date: Jul. 31, 2022

(87) PCT Pub. No.: WO2021/165203
PCT Pub. Date: Aug. 26, 2021

(65) Prior Publication Data
US 2023/0337068 A1    Oct. 19, 2023

(30) Foreign Application Priority Data
Feb. 20, 2020   (EP) .................................... 20158406

(51) Int. Cl.
*H04W 36/00* (2009.01)
*H04W 12/04* (2021.01)

(52) U.S. Cl.
CPC ....... *H04W 36/0038* (2013.01); *H04W 12/04* (2013.01); *H04W 36/00835* (2018.08)

(58) Field of Classification Search
CPC ............. H04W 36/0038; H04W 12/04; H04W 36/00835
See application file for complete search history.

(56) References Cited

U.S. PATENT DOCUMENTS

2013/0247150 A1   9/2013 Cherian et al.
2014/0050320 A1*  2/2014 Choyi ................... H04W 12/06
                                                  380/270

(Continued)

FOREIGN PATENT DOCUMENTS

CN    104768195 B    2/2019
EP    2953277 A1    12/2015

(Continued)

*Primary Examiner* — Samina F Choudhry

(57) ABSTRACT

Because of the line-of-sight character of optical wireless communication and a limited field-of-view of optical receivers, the coverage of an access point (120) and the overlapping coverage area of adjacent access points (120) in an optical system are smaller as compared to a RF system. It turns more challenging to support an end point (110) to roam securely in an optical multi-cell wireless communication network (100). To address that problem, a subsystem is disclosed to select for the end point (110) a candidate access point out of the plurality of access points (120) in view of one or more neighbor relationships, and to inform the end point (110) about the candidate access point to trigger the end point (110) to start a procedure for pre-establishing a new pairwise transient key between the end point (110) and the candidate access point (120) for a secure handover.

15 Claims, 7 Drawing Sheets

(56) References Cited

U.S. PATENT DOCUMENTS

2017/0064760 A1* 3/2017 Kandagadla ............ H04W 4/80
2019/0261239 A1 8/2019 Wang et al.

FOREIGN PATENT DOCUMENTS

| WO | 2018108294 A1 | 6/2018 |
| WO | 2018112895 A1 | 6/2018 |

* cited by examiner

SECURE HANDOVER IN A LIFI NETWORK

CROSS-REFERENCE TO PRIOR APPLICATIONS

This application is the U.S. National Phase application under 35 U.S.C. § 371 of International Application No. PCT/EP2021/053645, filed on Feb. 15, 2021, which claims the benefit of European Patent Application No. 20158406.7, filed on Feb. 20, 2020. These applications are hereby incorporated by reference herein.

FIELD OF THE INVENTION

The invention relates to the field of roaming of network devices in optical wireless networks, such as Li-Fi networks. More particularly, various methods, apparatus, systems and computer-readable media are disclosed herein related to assist a network device to have a fast handover from one access point to another in a secure manner.

BACKGROUND OF THE INVENTION

To enable more and more electronic devices like laptops, tablets, and smartphones to connect wirelessly to the Internet, wireless communication confronts unprecedented requirements on data rates and also link qualities, and such requirements keep on growing year over year, considering the emerging digital revolution related to Internet-of-Things (IoT). Radio frequency technology like Wi-Fi has limited spectrum capacity to embrace this revolution. In the meanwhile, light fidelity (Li-Fi) is drawing more and more attention with its intrinsic security enhancement and capability to support higher data rates over the available bandwidth in visible light, Ultraviolet (UV), and Infrared (IR) spectra. Furthermore, Li-Fi is directional and shielded by light blocking materials, which provides it with the potential to deploy a larger number of access points, as compared to Wi-Fi, in a dense area of users by spatially reusing the same bandwidth. These key advantages over the wireless radio frequency communication make Li-Fi a promising solution to mitigate the pressure on the crowded radio spectrum for IoT applications. Other benefits of Li-Fi include guaranteed bandwidth for a certain user, and the ability to function safely in areas otherwise susceptible to electromagnetic interference. Therefore, Li-Fi is a very promising technology to enable the next generation of immersive connectivity.

There are several related terminologies in the area of lighting-based communication. Visible-light communication (VLC) transmits data by intensity modulating optical sources, such as light emitting diodes (LEDs) and laser diodes (LDs), faster than the persistence of the human eye. VLC is often used to embed a signal in the light emitted by an illumination source such as an everyday luminaire, e.g. room lighting or outdoor lighting, thus allowing use of the illumination from the luminaires as a carrier of information. The light may thus comprise both a visible illumination contribution for illuminating a target environment such as a room (typically the primary purpose of the light), and an embedded signal for providing information into the environment (typically considered a secondary function of the light). In such cases, the modulation may typically be performed at a high enough frequency to be beyond human perception, or at least such that any visible temporal light artefacts (e.g. flicker and/or strobe artefacts) are weak enough and at sufficiently high frequencies not to be noticeable or at least to be tolerable to humans. Thus, the embedded signal does not affect the primary illumination function, i.e., so the user only perceives the overall illumination and not the effect of the data being modulated into that illumination.

The IEEE 802.15.7 visible-light communication personal area network (VPAN) standard maps the intended applications to four topologies: peer-to-peer, star, broadcast and coordinated. Optical Wireless PAN (OWPAN) is a more generic term than VPAN also allowing invisible light, such as UV and IR, for communication. Thus, Li-Fi is generally accepted as a derivative of optical wireless communications (OWC) technology, which makes use of the light spectrum in a broad scope to support bi-directional data communication.

In a Li-Fi system, the signal is embedded by modulating a property of the light, typically the intensity, according to any of a variety of suitable modulation techniques. For communication at high speed, often Infrared (IR) rather than visible light communication is used. Although the ultraviolet and infrared radiation is not visible to the human eye, the technology for utilizing these regions of the spectra is the same, although variations may occur as a result of wavelength dependencies, such as in the case of refractive indices. In many instances there are advantages to using ultraviolet and/or infrared as these frequency ranges are not visible to the human eye, and more flexibility can be introduced in the system. Of course, ultraviolet quanta have higher energy levels compared to those of infrared and/or visible light, which in turn may render use of ultraviolet light undesirable in certain circumstances.

Based on the modulations, the information in the light can be detected using any suitable light sensor. For example, the light sensor may be a photodiode. The light sensor may be a dedicated photocell (point detector), an array of photocells possibly with a lens, reflector, diffuser or phosphor converter (for lower speeds), or an array of photocells (pixels) and a lens for forming an image on the array. E.g., the light sensor may be a dedicated photocell included in a dongle which plugs into a user device such as a smartphone, tablet or laptop, or the sensor may be integrated and or dual-purpose, such as an array of infrared detectors initially designed for 3D face recognition. Either way this may enable an application running on the user device to receive data via the light.

In the following, the term "access point" of a Li-Fi system is used to designate a logical access device that can be connected to one or more physical access devices (e.g. optical transceivers). Such a physical access device may typically be located at a luminaire and the logical access point may be connected to one or more physical access devices each located at one or more luminaires. An access point serves one or more network devices or end devices associated to it to form an optical cell.

Li-Fi has an intrinsic benefit to reduce the chance of eavesdropping as compared to a radio frequency (RF)-based communication system, because of the physical property of an optical link requiring line-of-sight communication. On top of this intrinsic advantage, the security aspect can be further enhanced in a Li-Fi system by introducing security dedicated measures, such as authentication and encryption.

The extensible authentication protocol (EAP) is an authentication framework commonly used for wireless networks and Internet connections. The IEEE 802.1X standard defines how to provide authentication for devices trying to connect with other devices on LANs or wireless LANs (WLANs), which specifies the encapsulation of EAP over IEEE 802 standard. Therefore, IEEE 802.1X is also called "EAP over LAN or WLAN". IEEE 802.1X authentication involves three parties: a supplicant, an authenticator, and an authentication server. The supplicant is a client or end device that wishes to get access to the LAN/WLAN. The authenticator is a network device which provides a data link between the client and the network and can allow or block network traffic between the two, such as an Ethernet switch or a wireless access point. The authentication server is typically a trusted server that can receive and respond to requests from clients for network access and can tell the authenticator if the connection is to be allowed, and various settings that should apply to that client's connection or setting. Authentication servers typically run software supporting the Remote Authentication Dial-In User Service (RADIUS) and EAP protocols.

In order to generate encryption keys to encrypt the actual data, a 4-way handshake is typically required to exchange four messages between an authenticator and a client device, or supplicant. Depending on the type of communication, different keys may be used. The master session key (MSK) is the first key that is generated either from IEEE 802.1X/EAP or derived from pre-shared key (PSK) authentication. Group temporal key (GTK) is used to encrypt all broadcast and multicast traffic between an access point and multiple client devices, which is shared between the multiple client devices and one access point. Pairwise Transit Key (PTK) is used to encrypt all unicast traffic between a client station and the access point. Therefore, PTK is unique between a client station and the access point. Pairwise master key (PMK) is the key generated from master session key (MSK), and the PTK is dependent on the PMK. Similarly, group master key (GMK) is also generated from master session key (MSK), and the GTK is dependent on GMK.

However, the procedures for authentication and security key establishment result in extra latency not only when a network device sets up a link in a network for the first time, but also when it roams from one cell to another. Furthermore, if the network device is in the middle of a communication session during the handover from one cell to another, such extra latency may be more problematic.

SUMMARY OF THE INVENTION

Because of the line-of-sight character of optical wireless communication and a limited field-of-view (FoV) of optical transceivers, the coverage of an access point (AP) and the overlapping coverage area of adjacent APs in an optical system are smaller as compared to a RF based system. Due to the small coverage area per optical access point or per optical cell and due to a need to reduce mutual interference among adjacent access points, the overlapping coverage areas of adjacent cells in such optical systems are also typically small. Therefore, a moving end point in an optical wireless network will require much faster transitions (e.g. handovers) between access points than for a RF-based network or other type of cellular network with large coverage area per access point and large overlapping areas. Therefore, to support an end point to carry out a secure and smooth handover from one optical access point to another becomes more challenging.

In view of the above, the present disclosure is directed to methods, apparatus, systems, computer program and computer-readable media for providing a mechanism to support a fast secure handover of an end point (EP) from an access point (AP) currently associated with the EP to another AP out of a plurality of APs. More particularly, the goal of this invention is achieved by a system as claimed in claim 1, by a subsystem as claimed in claim 2, by an EP as claimed in claim 10, by methods as claimed in claims 13 and 14 for the subsystem and the EP respectively, and by a computer program as claimed in claim 15.

Accordingly, a subsystem comprised in or connected to the currently associated AP of the EP is capable to select for the EP a candidate AP by considering one or more neighboring relationships obtained from the plurality of APs, and to inform the EP in order to trigger the EP to start a procedure for pre-establishing a new pairwise transient key between the EP and the candidate AP before the secure handover actually takes place.

In accordance with a first aspect of the invention a subsystem is provided. A subsystem for supporting an end point to carry out a secure handover from an access point currently associated with the end point to another access point out of a plurality of access points in an optical multi-cell wireless communication network, the subsystem being configured to obtain one or more neighbor relationships among the plurality of access points; select for the end point a candidate access point out of the plurality of access points, other than the currently associated access point, for a secure handover of the end point, in view of the obtained one or more neighbor relationships; and inform the end point via the currently associated access point about the candidate access point to trigger the end point to start a procedure for pre-establishing a new pairwise transient key between the end point and the candidate access point for the secure handover.

By anticipating a potential handover to a candidate access point, the end point may prepare for the potential handover before it actually takes place. Such anticipation can be made by the end point itself, for example upon detection a downlink communication from the neighbor access point. However, due to the small overlapping area of adjacent cells, it might be too late for the end point to start a procedure to pre-establish a pairwise security key or pairwise transient key with a neighbor access point after it enters the overlapping area. Therefore, it is advantageous to make use of a subsystem, which obtains an overview of the neighbor relationships among the plurality of access points, to pre-select for the end point at least one candidate access point for a potential handover. Upon reception of information related to the candidate access point, the end point may then already start the procedure for pre-establishing a new pairwise transient key with the candidate access point for a potential handover, well before it enters the overlapping area of the two adjacent access points. In that sense, the additional procedure for establishing a pairwise security key or pairwise transient key will not bring extra latency to the handover of the end point.

The subsystem may also provide a further instruction via the currently associated access point to the end point to trigger the end point to actually handover to the candidate access point, either immediately following the further instruction or after a certain interval from receiving the further instruction. It may also be the option that the end point will make the decision by itself about the handover moment, and the decision may be made according to a comparison on signal strengths of the optical wireless communication links with the currently associated access point and the candidate access point.

In one embodiment, the subsystem is a centralized subsystem comprised in a central controller, and wherein the central controller is configured to communicate with the plurality of access points via backbone connections.

The subsystem can be implemented in a centralized manner, such as being comprised in a central controller. The central controller is connected to the plurality of access points via a backbone connection, which is a stable and high-speed link and in certain scenarios may even be an always-connected link. The backbone connection can be a wired connection, such as Ethernet, or a wireless connection based on radio frequency (RF) or millimeter-wave. The backbone connection can also be another kind of optical wireless link that is different from the one that an end point is performing in the optical multi-cell wireless network. Such an example can be free space optical communication. The information about the selected candidate access point is sent from the subsystem to the end point via the associated access point, which is also connected to the backbone network via a backbone connection. The centralized subsystem is a preferred setup for a large optical multi-cell network with a large number of access points in the network but may be beneficial even in smaller systems. Provided that all the access points can reach the centralized subsystem with backbone connections, it may be more efficient in terms of collecting the neighbor relationships and making a smart selection of a candidate access point for a potential handover.

In another embodiment, the subsystem is a distributed subsystem comprised in one or more access points out of the plurality of access points, and wherein the plurality of access points are configured to communicate with one another via backbone connections.

It is also possible to realize the subsystem in a distributed manner, where the distributed subsystem is comprised in one or more access points that are connected to one another via a backbone connection. Hence, the related one or more access points coordinate with each other to carry out the functions of the subsystem in a collective manner. The benefit of this distributed subsystem is that no dedicated central device is needed, and it is more flexible and convenient to implement the distributed subsystem. Therefore, this option is most preferred by a system with a small network scale, which saves the extra cost to deploy a dedicated central device. However, when the network scales up, the complexity of the mutual neighboring relationships goes up, and it may become less efficient as compared to the centralized approach, in view of information exchange and coordination among the one or more access points involved in the distributed system. By providing subsystem coordinating functions within one or more access points, a gradual network growth may be initially supported via the distributed subsystem. When the network scales to a certain size, the local subsystem coordinating functions may be disabled in the one or more access points, and correspondingly, a Li-Fi controller with a centralized subsystem may be added in the network to reduce the coordinating overhead for the one or more access points.

Advantageously, a neighbor relationship of the one or more neighbor relationships is obtained by detection of a downlink advertisement from a neighbor access point other than an associated access point, by the end point and/or a further end point residing in an overlapping area of the respective neighboring access point and the respective associated access point, and wherein the detection is reported to the subsystem via the respective associated access point.

Due to the lack of direct line-of-sight of adjacent access points, which are typically, but not necessarily, located on the same planar surface, the information related to the neighbor relationships among the plurality of access points are typically not directly available. However, an end point located in the overlapping area of two adjacent access points or two adjacent optical cells is able to detect signals from both. In a preferred setup, an access point periodically sends out downlink advertisements, which may comprise a unique identifier of the access point, to announce its presence. By detecting such a downlink advertisement from a neighbor access point rather than the currently associated access point, the end point can report the presence of the neighbor access point to the subsystem via the currently associated access point. With the end point and/or a further end point roaming through the area, the subsystem can build up over time a good overview of the neighbor relationships among the plurality of access points. If the end point and/or the further end point keep on providing such information upon detection of a downlink advertisement from a different access point other than the one that they are associated to, the overview obtained by the subsystem is also updated from time to time.

In another preferred embodiment, a neighbor relationship of the one or more neighbor relationships is obtained by detection of an uplink advertisement from the end point and/or a further end point by a further access point out of the plurality of access points, and wherein the end point and/or the further end point are not associated with the further access point, and wherein the detection by the further access point is reported to the subsystem.

In another setup, the end point is configured to send out an uplink advertisement, which may comprise a unique identifier of the end point, to announce its presence. Such an uplink advertisement will be detected by one or more access points in the coverage area of the optical link from the end point. Thus, when the end point enters into an area that covers both the currently associated access point and a neighbor access point in the field of view, the neighbor access point will recognize from the received uplink advertisement that the end point is not associated to the neighbor access point itself and will report the detection to the subsystem. With the report from the neighbor access point and the knowledge on the association between that end point and its currently associated access point, a neighbor relationship can be derived by the subsystem with regard to the neighbor access point and the currently associated access point of that end point. Similar to the previous scenario where the neighbor relationships are built up based on downlink advertisements, the subsystem can also build a good overview of the neighbor relationships based on the uplink advertisements of one or more end points over time, when the one or more end points roam through the area.

In one embodiment, the candidate access point is selected by considering a floor plan providing a layout of an area where the plurality of access points are located and spatial locations of the plurality of access points in the area.

With the information available about the neighbor relationships around the currently associated access point, the subsystem can have a good selection of candidate access points for potential handovers of the end point. However, that selection can be further improved by considering additional information, such as a floor plan of an area and the locations of the access points in that area.

The floor plan may provide a layout of the area comprising information on the room partitioning, room layout, furniture in the rooms, entrances to the rooms, corridors, and etc. Such knowledge on a floor plan helps the subsystem to filter out some of the adjacent access points as candidate access points for a potential handover, in case those adjacent access points are located in different rooms rather than the room that the currently associated access point is located in.

In another example, if the currently associated access point is located to the one side of a big desk, an adjacent access point to the opposite side of the desk is also less likely to be the candidate access point for an immediate handover, because a direct path for a roaming device between the two access points is actually blocked by the desk.

In another embodiment, the candidate access point is selected by considering statistics on handovers between the currently associated access point and other access points out of the plurality of access points.

Preferably, the selection of the one or more candidate access points can be further improved by considering statistics on a handover history of the currently associated access point, which may be in the form of a probability distribution of previous handovers from the access point of interest to any one of the adjacent access points. A higher probability of occurrences in the past may be indicative of a larger chance of a future handover event. Therefore, such statistics may also be considered by the subsystem in addition to other aspects, which may enable the subsystem to have a self-learning capability to adapt to any change in the system, such as a change on the layout of the area, or a change in the multi-cell optical network.

The information related to the one or more candidate access points may further comprising estimated handover probabilities of handover from the currently associated access point to each of the one or more candidate access points. By obtaining the more detailed information, the end point may decide by itself, according to the estimated handover probabilities, on a sequence of pre-establishing individual pairwise transient key or pairwise security key with the one or more candidate access points. The end point may even select a subset out of the one or more candidate access points, suggested by the subsystem, for pre-establishing keys.

Advantageously, more than one candidate access point is selected comprising at least a direct neighbor and a non-adjacent further neighbor of the currently associated access point, and wherein the non-adjacent further neighbor is adjacent to the direct neighbor.

Considering the relatively small coverage of a single optical cell, it could be even more beneficial to anticipating several subsequent handovers, which comprise a potential handover from the currently associated access point to a direct neighbor, and also one or more succeeding potential handovers from the direct neighbor to a non-adjacent further neighbor and/or from the non-adjacent further neighbor to an even further access point. In a preferred setup, the non-adjacent further neighbor is selected when a predicted handover probability of a subsequent handover from the direct neighbor to the non-adjacent further neighbor is higher than a certain threshold. Therefore, by knowing the candidate access points of several potential subsequent handovers, the end point can pre-establish a couple of pairwise security keys or pairwise transient keys, each dedicated to a different potential access point, well ahead. Such a prediction on several correlated subsequent handovers can be made with regard to the floor plan comprising the relevant access points and/or the statistics on handover history of the currently associated access point, the direct neighbors of the currently associated access point, and even the non-adjacent further neighbors. To pre-establish pairwise security keys or pairwise transient keys for several subsequent handovers can be crucial to contribute to a high-quality session for a fast-moving end point.

In accordance with a second aspect of the invention an end point is provided. An end point for performing a secure handover from an access point currently associated with the end point to another access point out of a plurality of access points in an optical multi-cell wireless communication network, the end point comprising an optical transceiver configured to perform optical wireless communication; a controller configured to secure an optical wireless communication link with the currently associated access point by using a pairwise transient key to encrypt or decrypt data communicated on the link; and to trigger a procedure for pre-establishing a new pairwise transient key between the end point and a candidate access point for a secure handover, upon reception of information related to the candidate access point by the optical transceiver; and wherein the procedure is triggered before the handover to the candidate access point actually takes place.

As disclosed above, the subsystem has the overview of the neighbor relationships among the plurality of access points in the network and provides an input to the end point related to one or more candidate access points for a potential handover. On the other hand, the end point maintains the active communication link with the currently associated access point, and it may trigger the procedure for pre-establishing the security key upon information available about the one or more candidate access points, regardless of the actual distance from the candidate access points. With the early notification from the subsystem, it is to the end point's advantage to prepare the security aspect of a potential handover in advance but without spending effort on predicting the candidate access point. Therefore, the end point can enjoy a smooth handover without experiencing data rate degradation either due to latency resulted from key derivation or due to extra caution required for predicting the candidate access point. In the meanwhile, the on-going session after the potential handover can be protected at the same security level via a pairwise transient key or a pairwise transient key.

The procedure for pre-establishing a new pairwise transient key between the end point and a candidate access point may further comprise a request for resource allocation from the end point to the candidate access point. In that sense, the end point will also reserve resource in the candidate access point.

The controller may be further configured to trigger the procedure to handover to a selected candidate access point according to a further instruction received from the currently associated access point or received from the subsystem via the currently associated access point. In this manner, the mechanism may for example also consider a traffic load condition of the currently associated access point and the candidate access point when performing handover in a multi-cell network with overlapping cells. It can also be an option that the optical transceiver is further configured to monitor the link qualities with both the currently associated access point and the candidate access point. The optical transceiver may provide the information related to the comparison of the link qualities to the controller, and then the controller may decide when to start a handover, and the handover can be either a hard handover or a soft handover. The soft handover indicates that the end point may receive and combine data from both the earlier associated access point and the candidate access point.

In a preferred setup, the optical transceiver is further configured to send a report to the currently associated access point upon detection of a downlink advertisement from a neighbor access point other than the currently associated access point.

In one option, the plurality of access points periodically sends out advertisements comprising individual identifiers to announce their presence to the surrounding end devices. Hence, it is beneficial to make use of such downlink advertisements to build up the overview on neighbor relationships. When the end point enters an overlapping area of the currently associated access point and a neighbor access point, the end point reports to the currently associated access point about the detection of a downlink advertisement from a neighbor access point. Then the currently associated access point can forward such information to the subsystem so as to assist the subsystem to derive the neighbor relationship between the two related access points.

In another preferred setup, the optical transceiver is further configured to send an uplink advertisement about the presence of the end point.

In another option, the end point is configured to send out an uplink advertisement comprising its identifier to announce its own presence. It is thus beneficial to let an access point report the detection of such an uplink advertisement from an end point that is not associated to itself to the subsystem. Combining the report received from a neighbor access point and the information on the currently associated access point of that end point, the subsystem can easily identify the neighbor relationship between the two related access points.

In a particularly advantageous system for supporting an end point to carry out a secure handover from an access point currently associated with the end point to another access point out of a plurality of access points in an optical multi-cell wireless communication network, the system comprises:
 a subsystem configured to obtain one or more neighbor relationships among the plurality of access points; select for the end point a candidate access point out of the plurality of access points, other than the currently associated access point, for a secure handover of the end point, in view of the obtained one or more neighbor relationships; and
 inform the end point via the currently associated access point about the candidate access point to trigger the end point to start a procedure for pre-establishing a new pairwise transient key between the end point and the candidate access point for the secure handover;
 the end point comprising an optical transceiver configured to perform optical wireless communication; a controller configured to secure an optical wireless communication link with the currently associated access point by using a pairwise transient key to encrypt or decrypt data communicated on the link; trigger the procedure for pre-establishing the new pairwise transient key between the end point and the candidate access point for a secure handover, upon reception of information related to the candidate access point by the optical transceiver; and wherein the procedure is triggered before the handover to the candidate access point actually takes place; and
 the plurality of access points, comprising the currently associated access point and the candidate access point, configured to perform optical wireless communication with the end point and to connect with one another via a backbone connection;
and wherein the subsystem is either comprised in one or more access points out of the plurality of access points or is connected to the plurality of access points via a backbone connection.

In accordance to a third aspect of the invention, a method of a subsystem is provided. A method for supporting an end point to carry out a secure handover from an access point currently associated with the end point to another access point out of a plurality of access points in an optical multi-cell wireless communication network, the method comprising the steps of the subsystem: obtaining neighbor relationship among the plurality of access points; selecting for the end point a candidate access point out of the plurality of access points, other than the currently associated access point, for a secure handover of the end point, in view of the obtained neighbor relationship; and informing the end point via the currently associated access point about the candidate access point to trigger the end point to start a procedure for pre-establishing a new pairwise transient key between the end point and the candidate access point for the secure handover.

In accordance to a fourth aspect of the invention, a method of an end point is provided. A method of an end point for performing a secure handover from an access point currently associated with the end point to another access point out of a plurality of access points in an optical multi-cell wireless communication network, the method comprising the steps of the end point: performing optical wireless communication with the currently associated access point; securing an optical wireless communication link with the currently associated access point by using a pairwise transient key to encrypt or decrypt data communicated on the link; triggering a procedure for pre-establishing a new pairwise transient key between the end point and a candidate access point for a secure handover, upon detection of information related to the candidate access point, and wherein the procedure is triggered before the secure handover to the candidate access point actually takes place.

The invention may further be embodied in a computer program comprising code means which, when the program is executed by a subsystem or an end point comprising processing means, cause the processing means to carry out the method of the subsystem and the end point.

BRIEF DESCRIPTION OF THE DRAWINGS

In the drawings, like reference characters generally refer to the same parts throughout the different figures. Also, the drawings are not necessarily to scale, emphasis instead generally being placed upon illustrating the principles of the invention.

DETAILED DESCRIPTION OF EMBODIMENTS

Figure 1:
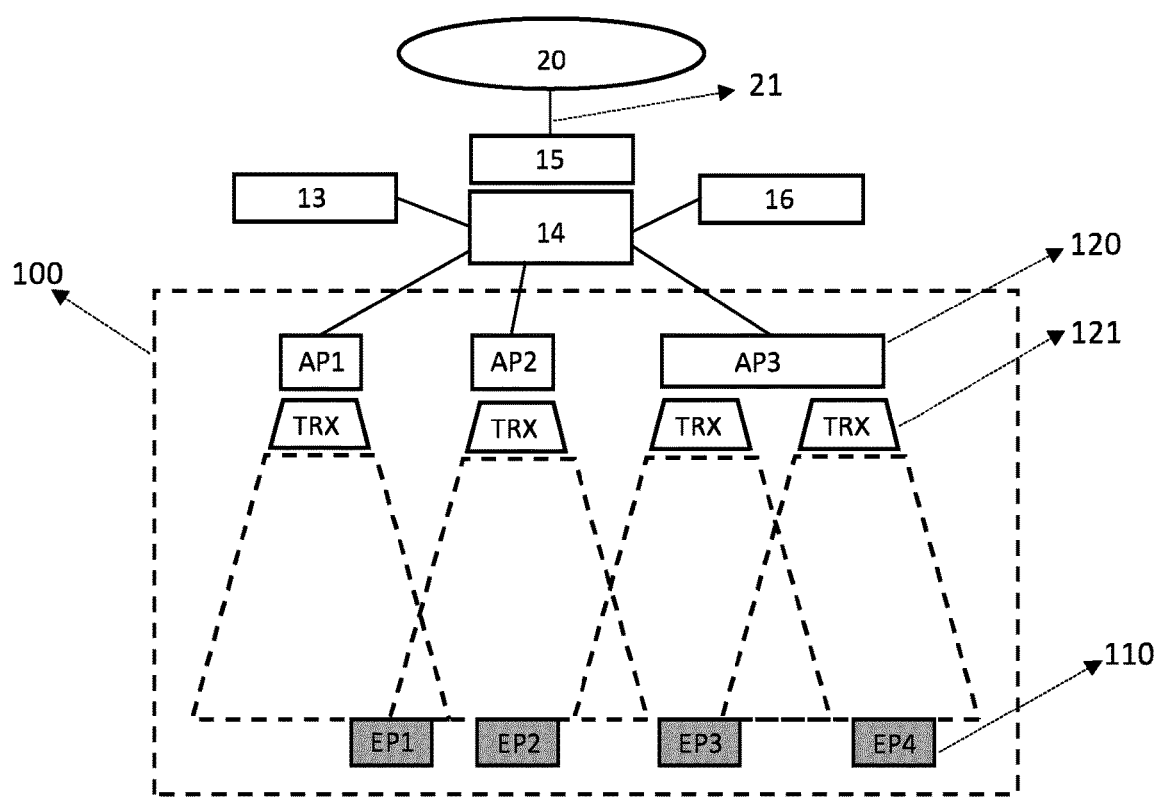
FIG. 1 demonstrates an overview of the OWC network, and the backbone network connected to it.

Various embodiments of the present invention will now be described based on an optical wireless communication (OWC) network system 100, or more specifically a Li-Fi network system, as shown in FIG. 1. For illustration purposes, the Li-Fi network 100 is connected to a backbone network 20 via an IP router 15 and an Ethernet switch 14, while in a practical system more routers and switches may be connected between the Li-Fi network and the backbone network. In this example, the Li-Fi network is connected to the backbone network via a backbone connection 21. The backbone connection is a stable and high-speed link, which can be a wired connection, such as Ethernet, or a wireless connection based on radio frequency (RF) or millimeter-wave. The backbone connection can also be another kind of optical wireless link that is different from the one that an end point is performing in the optical multi-cell wireless network. One example of the other kind of optical wireless link can be free space point-to-point optical links.

Li-Fi System Overview and Network Architecture

As a wireless communication technology for local area networking, Li-Fi plays a similar role as Wi-Fi to provide the last tens of meters connectivity. A Li-Fi network 100 may comprise a plurality of optical access points (APs) 120 and network devices or end points (EPs) 110. Each end point 110 is selectively associated to and synchronized with a respective one of the access points 120. A Li-Fi AP 120 may be connected to one or multiple optical front ends or Li-Fi transceivers (TRX) 121, for providing access to Li-Fi devices or Li-Fi end points (EPs) 110. The trapezoids shown in dash lines illustrate field-of-views (FoVs) or coverage of individual Li-Fi transceivers 121. Only when an EP 110 is located in the coverage of a Li-Fi AP 120, will it be able to receive a downlink communication from that AP 120. By assuming symmetrical up and down links of the optical communication, a bidirectional optical link can be built up under the same condition. Because of the line-of-sight character of the optical communication link, adjacent access points 120 do not have a direct optical link amongst each other, whereas an end point 110 located in the overlapping area of the coverage of adjacent access points 120 is able to detect optical signals from both access points.

In one example, a Li-Fi AP 120 may also operate as a domain master with additional functionalities according to G. hn, ITU G.9960 and G.9961, to manage several Li-Fi EPs 110. In one implementation, handover happens when an EP roams from one domain to another. In another implementation, each Li-Fi AP 120 is operated as a domain master managing an individual domain hosting multiple Li-Fi EPs, which can be up to 255 Li-Fi EPs. Such Li-Fi APs 120 are typically located on the ceiling. They may, but not necessarily, be collocated with luminaires, especially when the communication is not based on visible light. The main functions of a Li-Fi AP 120 may include to advertise the presence of an AP 120 to Li-Fi EPs 110 in the surroundings, to register and deregister Li-Fi EPs 110, to provide medium access control (MAC) scheduling among associated Li-Fi EPs 110, to collect interference reports from EPs 110, to adjust local schedule in response to interference reports, and/or to report neighboring relations to the Li-Fi controller 13. Some of the functions of the Li-Fi AP 120, such as MAC scheduling for interference avoidance, may be implemented by the Li-Fi controller 13 in a centralized manner.

Li-Fi EPs or Li-Fi devices 110 are end user modems that facilitates end devices to connect to the Li-Fi network 100. Nowadays, a Li-Fi EP 110 is typically a dedicated entity connected to a laptop or other end devices. In the future, a Li-Fi EP 110 may be partially or fully integrated to a smart phone, a tablet, a computer, a remote controller, a smart TV, a display device, a storage device, a home appliance, or another smart electronic device.

There may be a L-Fi controller or central controller 13 connected to the plurality of access points 120 in the Li-Fi network 100. The Li-Fi controller or central controller 13 is in charge of controlling the Li-Fi system in a centralized manner when necessary, such as deriving information about the topology and neighboring relationship, deciding scheduling among different Li-Fi access points (APs) for interference suppression. Furthermore, Li-Fi controller 13 may also be employed to provide a user interface that allows a user or admin, such as an IT manager, to configure schedules among multiple Li-Fi APs, monitor reports from these Li-Fi APs, and/or to derive further statistic information about the system performance. It is typically ensured that there is only one Li-Fi controller 13 is visible to an individual AP, which is achieved by means of network configuration so that traffic to and from a Li-Fi controller 13 is isolated inside its own network segment, via virtual LANs (VLANs) or similar. Furthermore, a protocol, such as a Control and Provisioning of Wireless Access Points (CAPWAP) protocol, can be used to discover multiple controllers and to select one controller that has free resources to host/manage an access point joining an infrastructure.

In one exemplary implementation the Li-Fi system may make use of G.vlc based technology, a Li-Fi synchronization server 16 is connected to the system, which is in charge of synchronizing (or aligning) the G.vlc medium access control (MAC) cycles of the different G.vlc domains. This is needed to align some common time slots for detecting neighboring APs 120 and avoiding interference to an EP 110 located in the overlapping area of neighboring APs 120. Because of the line-of-sight characteristic of an optical link, neighboring APs 120 typically cannot detect the signals from one another directly. However, an EP 110 located in the overlapping area of two neighboring APs 120 may experience interference if the neighboring APs 120 are transmitting simultaneously. To avoid such situation, it may be necessary to keep adjacent APs 120 synchronized to a common time base, and to prevent them to transmit at the same moment. One preferred option for network synchronization is to employ the Precision Time Protocol (PTP), IEEE 1588v2. The PTP provides a sub-microsecond accuracy, which is fair enough for inter G.vlc domain MAC alignment. To keep the PTP accuracy, support from Ethernet switch is necessary, which should also be PTP capable. To keep the PTP accuracy, any element in the Ethernet network must handle PTP so the switch selected for any deployment must support and be configured to operate in the PTP mode accordingly.

It may also happen that a Li-Fi system is to be deployed in a legacy system where PTP is not supported by the existing infrastructure. And hence, additional measures should be taken to synchronize neighboring APs 120 in a different and maybe sub-optimal manner, and accordingly a solution should be found for an EP 110 to deal with the non-ideal synchronization among neighboring APs 120.

Detailed System Description

Li-Fi AP

Figure 2:
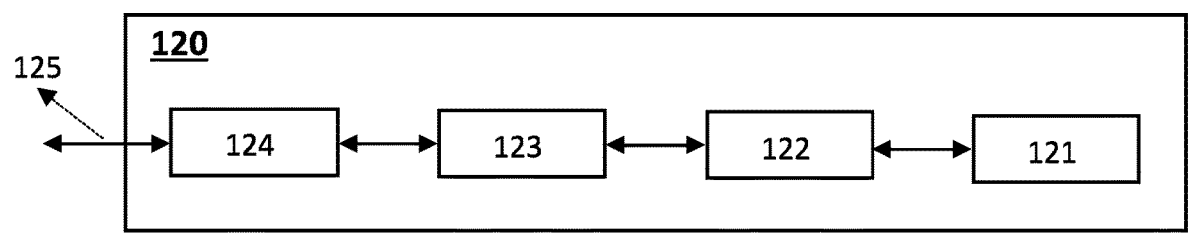
FIG. 2 schematically depicts basic components of a Li-Fi access point.

A Li-Fi AP 120 is a key unit to establish a Li-Fi network 100. In some scenarios, a Li-Fi AP 120 also forms the interface between an existing IT infrastructure and a Li-Fi network 100. A high-level block diagram of a Li-Fi AP 120 is shown in FIG. 2. On one side, the Li-Fi AP 120 has an interface 124 to a backbone network, which can be a wired connection (Ethernet), or a wireless connection (RF, millimeter-wave, or another kind of optical wireless that is different from the one a Li-Fi EP is performing). And on the other side, the Li-Fi AP 120 has an optical front end 121 to enable the optical link with one or more Li-Fi EPs 110. Furthermore, the Li-Fi AP 120 also carries out the function to implement bi-directional translation or conversion between the data on the backbone network 20 and data on an optical link, in terms of conversion between different modulation schemes and conditioning of the analog signals. Therefore, a Li-Fi AP 120 comprises at least also a digital modulator and demodulator component 123 and an analog front end 122. In the transmission path, the analog front end (AFE) 122 may comprise a programmable amplifier, a filter, and a driver to condition and amplify the baseband signal to drive the optical front end. For the receiving path, the AFE 122 may comprise an attenuator, a low noise amplifier, a filter and a programmable gain amplifier to accommodate the received signals for the further digital processing.

The optical front end 121 comprising at least a light source and a light sensor implements the conversion between electrical signals and optical signals. In the transmitter chain, the optical front end 121 is used to convert the electrical transmitting signals to output optical signals via the light source. In the receiver chain, the optical front end 121 is used to convert the received optical signals to output electrical signals via the light sensor for further signal processing. The optical front end 121 is also called Li-Fi transceiver (TRX), such that: Li-Fi transmitter (Tx): transforms an electrical signal obtained from the AFE to an optical signal (e.g. to be emitted by an LED), and Li-Fi receiver (Rx): transforms a received optical signal (e.g. from a photodiode) to an electrical signal for the AFE.

Figure 3:
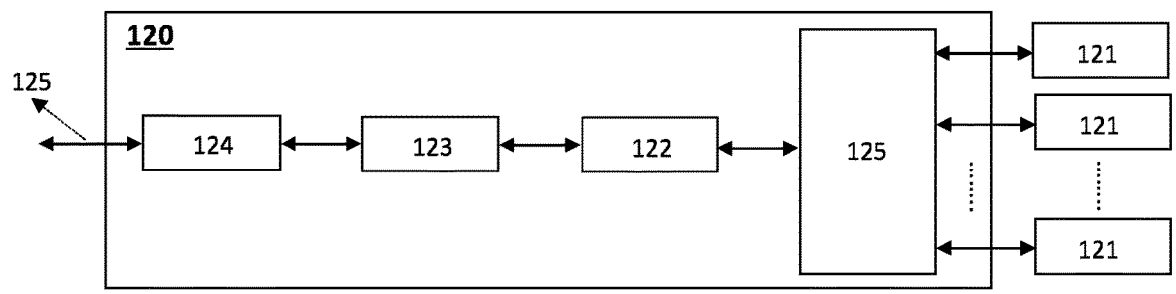
FIG. 3 schematically depicts basic components of a Li-Fi access point with multiple optical front ends.

A Li-Fi AP 120 may be connected to a single Li-Fi TRX 121, or multiple Li-Fi TRXs 121, which allows to transmit the optical signals over different optical paths. In case a Li-Fi AP 120 is connected to multiple Li-Fi TRXs 121, the Li-Fi AP may handle them as one coherent signal, or as (partially) separate incoherent signals for establishing a communication link. FIG. 3 shows an example of a Li-Fi AP 120 with multiple Li-Fi TRXs 121. A Li-Fi interface component 125 is adopted to split or combine the data sent to or received from the multiple Li-Fi TRXs 121.

Li-Fi EP

Figure 4:
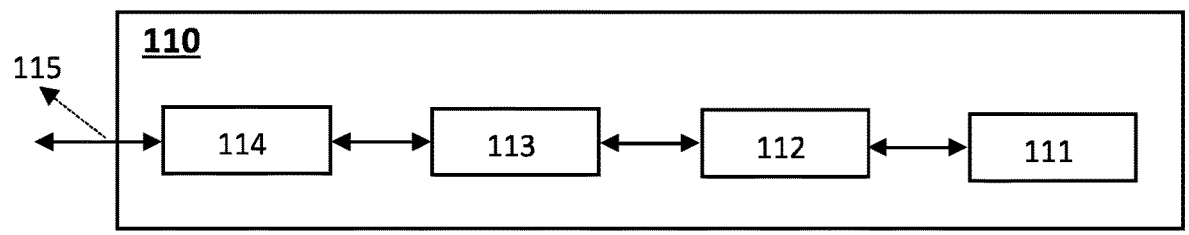
FIG. 4 schematically depicts basic components of a Li-Fi end point.

A high-level overview of a Li-Fi EP or a Li-Fi device 110 is shown in FIG. 4. Similar to a Li-Fi AP 120, a Li-Fi EP 110 comprises at least an optical front end 111, an analog front end 112, a digital modulator/demodulator 113, and an interface 114 to the end device or a processor.

A Li-Fi EP 110 may be connected to an end device as a separate entity via a cable or be partially or entirely integrated in the end device. For many end devices, such as laptop, smart phone, remote controller, Ethernet is a well-established interface in the operating system of the end devices. Li-Fi may also be used to provide communication interface to the end device in addition or instead. To simplify the system integration of a Li-Fi EP or Li-Fi device to the operating system of an end device, it is advantageous to employ Ethernet over USB. Therefore, in one option, the Li-Fi EP or Li-Fi device 110 can be connected to the end device via a standard USB cable. With the example of using Ethernet over USB, a Li-Fi EP 110 may comprise the Ethernet over USB interface 114 and connect to the end device via a USB cable 115. A Li-Fi EP 110 may also be connected to one or more client optical TRXs 111, same as in a Li-Fi AP 120. Alternatively, a single optical frontend that has segmented transmitters/receivers where each transceiver/receiver is directed in a different respective direction is also envisaged.

In another example, a different interface 114 may be used to connect the Li-Fi EP to the operation system of the end device, and the corresponding interface 114 (Ethernet over USB) and/or the cable 115 should be replaced accordingly.

Figure 5:
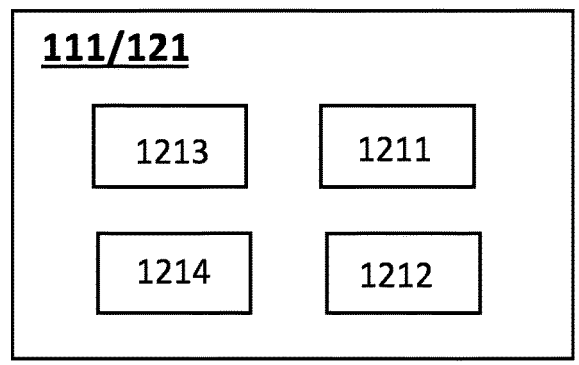
FIG. 5 schematically depicts basic components of an optical front end comprised in a Li-Fi access point or a Li-Fi end point.

FIG. 5 provides exemplary components of an optical front end or optical TRX 111,121 comprised in or connected to a Li-Fi AP 120 and a Li-Fi EP 110. An optical TRX 111, 121 comprises at least a light source 1211, a light sensor 1212, a driver 1213, and an amplifier 1214. The light source 1211 is used to convert the electrical transmitting signals to output optical signals, which can be a Light-emitting diode (LED), a Laser diodes (LD), or Vertical Cavity Surface Emitting Laser (VCSEL). The light sensor 1212 is used to convert the received optical signals to output electrical signals, which can be a photodiode, an avalanche diode, or another type of light sensor. The driver 1213 is mainly used for regulating the power required for the light source 1211. The amplifier 1214 is mainly used to condition the received signals by the light sensor 1212 to make the signals suitable for further processing in the electrical circuits. In one example, the amplifier 1214 can be a transimpedance amplifier (TIA), which is a current to voltage converter implemented with one or more operational amplifiers. TIA may be located close to the receiving light sensor or photodiode 1212 to amplify the signal with the least amount of noise.

Inter-Connection in a Li-Fi System

Typically, Li-Fi APs 120 are deployed on the ceiling. And such APs 120 need to be powered first in order to carry out communication activities. Therefore, the connections to the APs 120 are meant for both power and data. An AP 120 sets up bidirectional link with the cloud, or the backbone network 20 at one side, and at the other side the AP 120 communicates with one or more associated EPs 110 via optical links. An EP 110 typically obtain power from the end device that the EP is coupled to or integrated in and communicates with an associated AP 120 via an optical link.

Connecting a Li-Fi AP to the Backbone Network

Different options can be taken for a Li-Fi AP 120 to get connected to the backbone network 20.

In one aspect, data and power may be jointly delivered to a Li-Fi AP, which can be implemented via a single power cable with power line communication (PLC) or a single Ethernet cable with power over Ethernet (POE).

PLC makes use of the existing power line cables, i.e. for providing a device with mains power, also for data communication. Popular PLC communication standards, such as HomePlug® or G.hn, utilize Orthogonal Frequency Division Multiplexing (OFDM) technology, which is also widely adopted in a Li-Fi system. Hence, the physical layers (PHY) of a PLC system and a Li-Fi system may be quite similar, such as the modulation methods and the synchronization methods used in both systems. However, transmission in the optical domain are unipolar whereas in general OFDM uses bipolar signals. As a result, some adaptation may be required for transmission in the optical network. A simple solution is the use of a DC-offset which does not require demodulation and subsequent remodulation of an OFDM based PLC signal prior to optical transmission, or alternatively demodulation and subsequent remodulation using unipolar OFDM modulation techniques such as ACO-OFDM, DCO-OFDM, ADO-OFDM and/or Flip OFDM. Therefore, it may be quite convenient for a Li-Fi AP 120, which is typically collocated with the luminaire on the ceiling, to make use of the existing power cable to obtain also the data connection to the backbone network 20.

However, it is also recognized that the channel of a PLC system is quite noisy, given that the mains power line may act as an antenna to pick up all kinds of undesired signals that may interfere with communication signals that are also present on the mains power line. It is thus important for the Li-Fi over PLC enabled devices to cope with such external interference. Furthermore, a communication signal over a mains power line experiences an amount of attenuation that cannot be predicted during manufacturing and may vary over the day. The impact factors include the length of the cable that varies from building to building, that power loads that form more or less a short circuit for high frequencies and be switched on or off, etc.

A known solution to address the problems introduced by a PLC system on signal integrity is to equip an Li-Fi over PLC enabled device with a PLC decoder for decoding a PLC communication signal received over the mains power line. Impairments on communication signals are handled digitally. For instance, a narrowband interferer causes error on just single subcarrier of an OFDM modulated signal. The reconstructed data may be corrected using error correction algorithms. Subsequently, the reconstructed data is then transformed back to the analog domain for modulating the LED current flowing to the at least one LED. In such a way, a more robust operating device can be provided wherein the loss of data is reduced, although one of the drawbacks of this solution is that the device gets large in size, complex, costly.

On the other hand, if power can be delivered via an Ethernet cable, it may also be convenient for a Li-Fi AP to make use of existing IT infrastructure to obtain both power and connection to the backbone network 20. Power over Ethernet (POE) is described in the IEEE802.3af/at standard and is currently being extended towards 4-pair power in the IEEE Task Force P802.3bt. PoE is intended to supply power voltage levels of 40 V to 48 V from Power Sourcing Equipment (PSE) to Powered Devices (PDs), alongside data lines for control and communication purposes. A PSE device is also referred to as POE switch. In PoE lighting systems PDs may be light sources, user interface devices and sensors. The PSE is typically powered from a mains power source, such as according to the IEC/TR 60083 standard. Traditional PoE systems will transport data and power over a network and its end points, hence among PSEs and PDs.

Data can therefore be received by the control device, e.g., via Ethernet connection using the Ethernet Protocol. Data is communicated via the Ethernet Protocol between devices in power over Ethernet systems. Therefore, a microchip in form of an Ethernet controller can be used to establish a communication link between the devices, which supports Media Access Control (MAC) and physical layer (PHY) of the Open Systems Interconnection model (OSI model).

An Ethernet connection can for example be an optical fiber, an electric wire or a twisted pair cable, such as a Cat 3 cable, Cat 4 cable, Cat 5 cable, Cat 5e cable, Cat 6 cable, Cat 6A cable, Cat 7 cable, Cat 7A cable, Cat 8 cable, Cat 8.1 cable, or Cat 8.2 cable. The Ethernet connection can have several pairs of cables, e.g., 2, 3, 4, or more pairs of cables. The cables can be unshielded or shielded, in particular individually or overall shielded. The power and data can be transmitted via the same fiber, wire, or cable of the Ethernet connection or via different fibers, wires, or cables of the Ethernet connection. In case of transmission of power via an optical fiber the power can be transmitted in the form of photons that can be received by a solar cell unit of the data receiving device.

The data receiving device in a PoE system can comprise one or more ports. Each of the ports can comprise one or more pins. A pin can be configured for receiving power, data or power and data. Additionally, or alternatively, the port can also comprise one or more solar cell units for receiving power in the form of photons. As the ports can receive power and data via the Ethernet connection some of the pins can be supplied with power, while other pins are supplied with data via the Ethernet connection. Alternatively, or additionally, a pin can also be supplied with power and data via the Ethernet connection.

In another aspect, data and power may be separately delivered to a Li-Fi AP, and the options can be either via both a power cable and an Ethernet cable (wired connection to a backbone network), or a combination of a power cable and a wireless link to the backbone 20 (optical wireless links or free space optical link).

Preferably, a Li-Fi system may be integrated to an existing wireless communication system, such as a Wi-Fi system or a cellular system. And hence, a Li-Fi AP 120 may be integrated to or directly-connected a Wi-Fi access point or a cellular base station. By having a conversion or translation of signals between the Li-Fi AP 120 and the Wi-Fi access point or the cellular base station, the existing infrastructure of a Wi-Fi system or cellular system can be employed to provide the connection to the backbone network 20 for the Li-Fi AP 120.

Connecting a Li-Fi EP to a Li-Fi AP

A Li-Fi EP 110 gets access to a Li-Fi system via a Li-Fi AP 120, and the associated Li-Fi AP 120 is often called a local AP. There are several aspects to be considered for the connection between a Li-Fi EP 120 and a Li-Fi AP 110:

Coverage: a Li-Fi EP may not always be able to see a Li-Fi AP depending on its location, its orientation, the positioning of the Li-Fi APs, and the size of the Li-Fi EP's transducer/sensor coverage area.

Downlink interference: a Li-Fi EP that is in the overlapping coverage area of multiple optical downlinks experiences interference if these Li-Fi APs transmit at the same time.

Uplink interference: A Li-Fi EP that transmits a signal to an associated Li-Fi AP while another Li-Fi EP is transmitting to this same Li-Fi AP results in uplink interference at the Li-Fi AP.

Handover: Because of the mobility of a Li-Fi EP, a handover is needed when a Li-Fi EP moves from the coverage area of one Li-Fi AP to a neighboring Li-Fi AP. That is to say, when a Li-Fi EP (such as connected to or comprised in a user device, a client device, a mobile phone, etc.), moves from the current cell to the neighboring cell, then any active communication must be handed over to the node or access point of that neighboring cell. Handovers are intended to be made as quickly as possible in order to reduce disruption to any ongoing communication or data transfers and may include a preparation period in order to facilitate this. When insufficient time is available to prepare and establish a link to the new Li-Fi AP before the link with the existing Li-Fi AP is broken, the Li-Fi EP may experience a period in which it has no connection. Considering the relatively small size of a Li-Fi cell due to the line-of-sight character of the optical link, seamless handover is important to guarantee the link quality and the user experience.

Basically, a Li-Fi EP 110 can be connected to a Li-Fi AP 120 via bidirectional optical link, or a hybrid downlink and uplink. Note that here the downlink stands for the communication link from the Li-Fi AP 120 to the Li-Fi EP 110, and the uplink stands for the communication link from the Li-Fi EP 110 to the Li-Fi AP 120. A bidirectional optical link enables a relatively symmetrical connection between the Li-Fi EP 110 and the Li-Fi AP 120. Hence, both downlink and uplink enjoy the same advantages of Li-Fi communication as addressed above. However, in some application scenarios, such as for web-surfing or video streaming, the link between a Li-Fi AP and a Li-Fi EP can also be a hybrid link, which is a combination of an optical downlink from the Li-Fi AP 120 to the Li-Fi EP 110 and a radio frequency (RF) uplink from the Li-Fi EP 120 to the Li-Fi AP 110. The RF link may be in accordance with a popular short-range wireless communication protocol, such as Wi-Fi, BLE, or Zigbee, or be in accordance with a cellular communication protocol, such as 4G or 5G cellular.

Referring back to the options that the Li-Fi AP 120 may be built via a combo device supporting both Li-Fi AP function and Wi-Fi access point or cellular base station function, such hybrid link can be handled seamlessly by a controller at the Li-Fi AP side. Since a Li-Fi EP 110 is typically connected or integrated to an end device, which can be a smart phone, a tablet, a computer, or another smart device, the end device may already have the hardware support for the short range wireless communication protocol or cellular protocol used in the hybrid link. Therefore, such hybrid link also leverages the existing resource of the end device, and provide a simplified solution for the Li-Fi EP, which only requires a receiving path, but not a transmitting path. The cost, power consumption, and form factor of the EP 110 may be further reduced in such a manner. Correspondingly, the Li-Fi AP 120 is also simplified by comprising mainly an optical transmitter to send data to the Li-Fi EP 110 via an optical downlink, whereas the RF-based uplink from the Li-Fi EP 110 to the AP 120 may be received by leveraging the RF receiver in the combo device or co-located Wi-Fi access point/cellular base station, or via a dedicated RF receiver comprised in the Li-Fi AP 120 itself.

Scheduling and Interference Suppression within an Optical Multi-Cell Wireless Network When there are multiple Li-Fi APs 120 deployed next to each other or when there are multiple EPs 110 associated to the same local AP 120 or to adjacent APs 120, medium access control (MAC) become necessary for an interference free optical communication. Different MAC mechanisms are possible to be employed in the optical multi-cell wireless network, such as time-division multiple access (TDMA), frequency-division multiple access (FDMA), carrier-sense multiple access (CSMA), code division multiple access (CDMA), space-division multiple access, or a combination of one or more aforementioned mechanisms. TDMA is based on time-division multiplexing scheme, where radio resource is scheduled in time domain and different time slots are assigned to different transmitters in a typically cyclically repetitive frame structure or MAC cycles. FDMA is based on frequency-division multiplexing, where different frequency bands are allocated to different devices for simultaneous transmission. And in optical communication, FDMA can also be evolved into wavelength division multiple access (WDMA), which is based on wavelength-division multiplexing. Another advanced version of FDMA is orthogonal frequency-division multiple access (OFDMA), where each device may use one or more subcarriers out of the entire band. OFDMA has more flexibility in providing different data rates or quality of service to different users, and in the meanwhile a high resource efficiency can be maintained despite of such diversity. CSMA typically employs "listen-before-talk" approach, where a device verifies the absence of any other traffic before transmitting on a shared medium. CSMA is widely used in a sparse network, and when the density of nodes scales, further collision-avoidance techniques come into place. CDMA is typically built on top of spread spectrum, and a common form is direct-sequence CDMA that is based on direct-sequence spread spectrum, where different devices send messages simultaneously with different spreading codes that are orthogonal to each other. Given the typically smaller FoV of an optical link as compared to a radio link, space-division multiple access may also be a very attractive solution here.

In a TDMA-based multi-cell network with multiple APs 120, due to the lack of direct communication, adjacent APs 120 sometimes may not have synchronous MAC cycles. Although the durations of one MAC cycle or super frame is typically the same for all the APs 120 in the network, the start times of MAC cycles can be different for individual APs 120. Note that the start time of a MAC cycle is used by an AP as a local time reference to divide the wireless medium into consecutive time slots. Such an offset of MAC cycles among two adjacent APs 120 may cause interference to an EP 110 located in the overlapping coverage areas of these two adjacent APs 120, even when a time slot is allocated exclusively to one AP 120 for communication with the EP 110 in the overlapping area. Therefore, it may be necessary for the APs 120 to synchronize to a common time base. The common time base may be obtained via synchronization handshake, via a reference clock distributed over the network (such as synchronous Ethernet clocks), or via a dedicated synchronization server in the network, or derived from a common signal, such as the zero crossing of the mains power. However, due to an uncertain delay in the network or an interference, there may still be timing synchronization uncertainty of the APs against the timing reference. It may still be necessary for an EP 110 located in the overlapping area of at least two adjacent APs 120 to derive timing information related to MAC cycles of the at least two APs 120 based on downlink communication from these APs, which can be either a normal data communication link or an out-of-band signaling message. Then, based on the derived timing information related to MAC cycles of the at least two APs 120, the EP 110 may further assist at least one out of the two adjacent APs 120 to adjust its MAC cycles to get aligned with the other.

Fast Secure Handover

For a Wi-Fi system, IEEE 802.11 defines that the communication for a handover or transition may be conducted directly with the neighboring access point, e.g., on a direct path (i.e. "over-the-air") or via the local access point of the distribution system (DS) (i.e. "over-the-DS"). In addition, the EP may want the neighboring access point to reserve resources prior to the transition, e.g., based on a fast transition (FT) resource request protocol according to section 13 of the IEEE 802.11 (2016) specification (Fast BSS transition). To this end, two FT protocols are defined. These are an FT protocol which is executed when a transition to a target access point is made and a resource request is not required prior to the transition, and an FT resource request protocol which is executed when a resource request is required prior to the transition. For a fast transition/handover of an EP from its currently associated access point to a target access point utilizing the FT protocols, message exchanges may be performed using the over-the-air approach (where the EP communicates directly with the target AP using an IEEE 802.11 authentication with an FT authentication algorithm) or the over-the-DS approach (where the EP communicates with the target AP via its current local AP). The communication between the EP and the target AP may be carried in FT action frames between the EP and its current local AP. Between the current AP and the target AP, the communication may be achieved via an encapsulation method, e.g., such as described in section 13.10.3 of the IEEE 802.11 (2016) specification. The current local AP may convert between the two encapsulations.

A fast and secure roaming technique based on the 802.11r amendment (officially known as fast BSS transition) is the first method to be officially ratified by the IEEE to perform fast secure transitions between Wi-Fi access points. It works by having the client complete an initial successful 802.1X Extensible authentication protocol (EAP) authentication with the authentication server. The resultant master session key (MSK) is, then, transferred to the Wireless LAN controller (WLC) like in other methods. The method, however, differs by deriving a slightly different key hierarchy. A pairwise master key (PMK)-R0 is derived from the MSK is known only to the client and the WLC. A PMK-R1 is derived from PMK-R0 and is known to the client and APs managed by the WLC that holds PMK-R0. The final level is the pairwise transient key (PTK), derived from PMK-R1 and is known to the client and the APs managed by the WLC. Typically, the APs managed by the WLC form a group referred to as a FT mobility domain, which is essentially all APs that have the same SSID. How PMK-R1 is made known to other APs is not defined by the IEEE 802.11r amendment.

During the initial authentication, the client performs full 802.1X authentication, completes the 4-Way Handshake to derive a Pairwise Transient Key Security Association (PTKSA) with the AP (using PMK-R1 key material), and then is allowed access to the network. When the client begins to roam, the client and the target AP derive a new key based on PMK-R1. The method is even more efficient since the four-way handshake takes place within the Open System Authentication from the client, Open System Authentication from the AP, Reassociation Request, and Reassociation Response. This substitutes the four-way handshake, which occurs after these frames in other methods.

There is a lesser deployed variant of this technique known as Fast BSS transition over the Distribution System (DS). With this technique, once the client decides it might roam to another AP, it sends a FT Action Request frame to the original AP. The client indicates the MAC address of the target AP where it wants to roam. The original AP forwards this FT Action Request frame to the target AP over the DS and the target AP responds to the client with an FT Action Response frame (also over the DS). Once this FT Action frame exchange is successful, the client finishes the FT roaming. The client sends the Reassociation Request to the target AP over-the-air and receives a Reassociation Response from the new AP in order to confirm the roaming and final key derivation. These last two messages are exchanged when the client finally roams to the target AP. Therefore, Fast Transition allows roaming faster than static PMK caching.

It is clear that a fast handover is crucial to guarantee the quality of service when an end point is roaming in a multi-cell network. As compared to a RF system, such as a Wi-Fi system, the design challenge is even bigger in a Li-Fi system, considering the smaller optical cell and the smaller overlapping area in an optical communication system.

Figure 6:
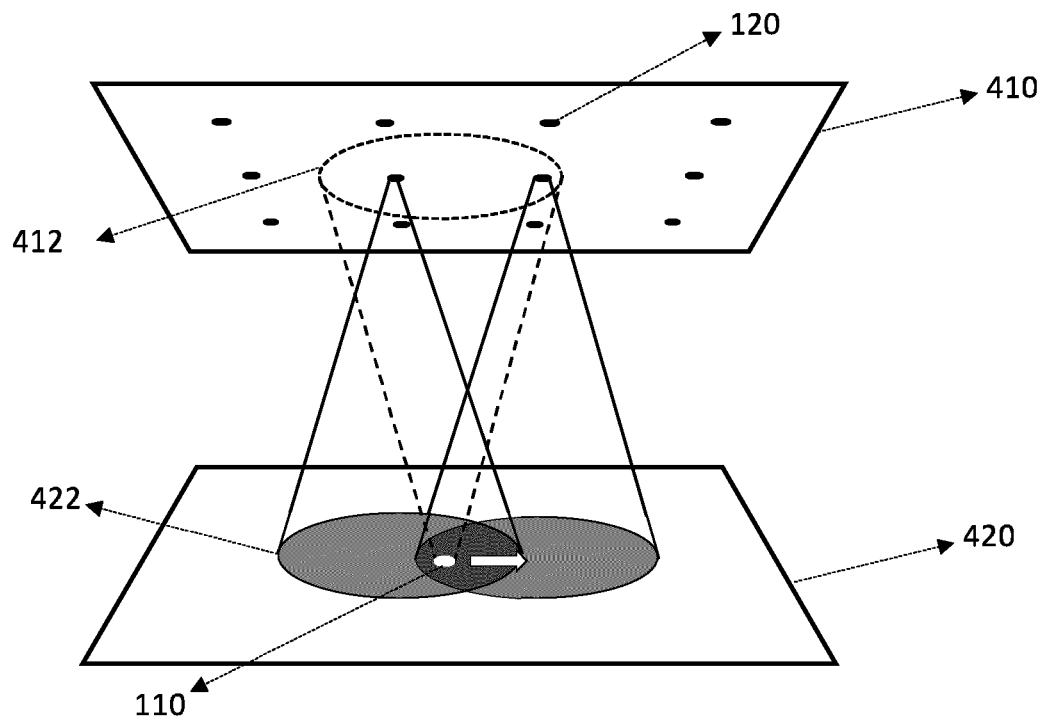
FIG. 6 illustrates an end point that roams in an optical multi-cell wireless communication network and the corresponding coverage areas of the end point, an associated access point, and a neighbor access point.

FIG. 6 illustrates an end point 110 roams in an optical multi-cell wireless communication network 100 and the corresponding coverage areas of the end point 110, an associated access point 120, and a neighbor access point 120. The plurality of access points, comprising at least the associated access point and a candidate access point, are located on a first planar surface 410. In a typical application scenario, the first planar surface 410 is the ceiling. On the first planar surface 410, the coverage area 412 of an end point is illustrated by a dash circle, which covers both the associated access point and a neighbor access point. The end point is located on a second planar surface 420, which can be the planar surface of the floor, the table, another horizontal surface that the end point is located, or any arbitrary planar area the end point is roaming with a user. On the second surface 420, the coverage areas 422 of the associated access point and the neighbor access point are illustrated with shadowed circles, and the end point 110 is located in an overlapping area of the two coverage areas. The arrow indicates the moving direction of the end point, which is heading for the neighbor access point and suggests a potential handover. In FIG. 6 the identical coverage areas of an end point and an access point are merely for an exemplary purpose. Depending on the optical components used by the plurality of access points and the end point, the coverage area 422 of an access point 120 and the coverage area 412 of an end point 110 may be different. Furthermore, even if the optical components remain the same, the actual coverage area will also change with the distance between the first and the second planar surfaces.

For the ease of explanation, it is assumed here that each access point 120 comprises a single optical front end, and each dot on the first planar surface 410 represents a different access point 120. Therefore, a fast handover is always necessary when the end point roams to the coverage of an adjacent access point 120. In another example, if an access point comprises more than one optical front ends, a handover may not be necessary when the end point is roaming within the coverage areas of multiple optical front ends belonging to the same access point 120 that is sending identical information via the multiple optical front ends.

Figure 7:
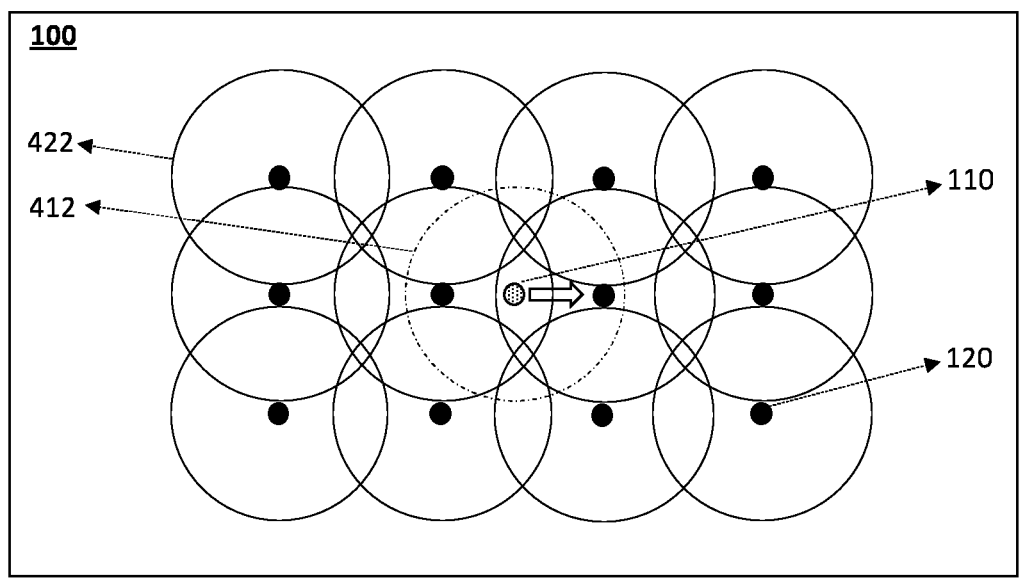
FIG. 7 illustrates an end point that roams in an optical multi-cell wireless communication network with an overlay top view of a first planar surface and a second planar surface.

FIG. 7 provides an overlay top view of the first planar surface 410 and the second planar surface 420, when the Li-Fi end point 110 is roaming in the optical multi-cell wireless communication network 100. It can be seen that depending on the moving trajectory of the end point different adjacent access points may be the candidate access point for a potential handover. In order to derive the information about the candidate access point, it is necessary for the subsystem 500, 510, 510' to first obtain the one or more neighbor relationships among the plurality of access points 120 in the optical multi-cell wireless communication network 100.

Figure 8:
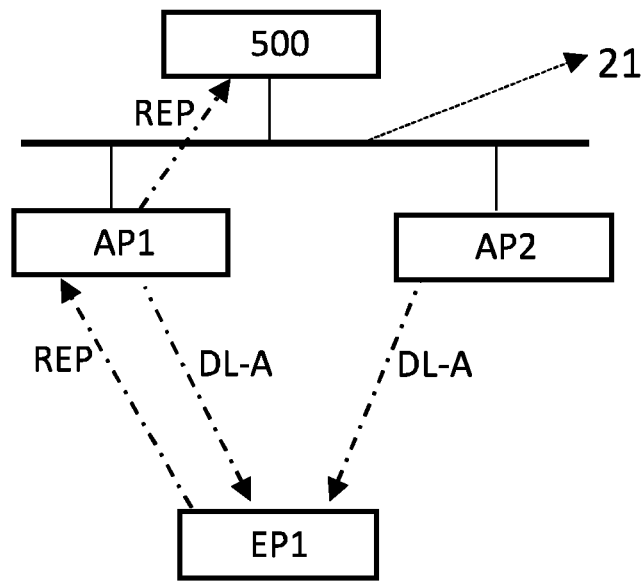
FIG. 8 illustrates the exchange of messages for building up neighbor relationships in a centralized subsystem via a downlink advertisement from the plurality of access points.

FIG. 8 illustrates the exchange of messages for building up the one or more neighbor relationships in a centralized subsystem 500 via a downlink advertisement from the plurality of access points 120. Given that adjacent access points AP1 and AP2 are typically located on the same planar surface, the first planar surface 410 shown in the figure, the field of view of the AP1 and AP2 are projected to the same second planar surface 420 where the end point 110 is located. Therefore, there is no direct line-of-sight optical link between adjacent access points 120. Thus, the information related to the neighbor relationships among the plurality of access points are not directly available. However, the end point EP1 located in the overlapping area of two adjacent access points or two adjacent optical cells is able to detect signals from both. In a preferred setup, an access point periodically sends out downlink advertisements DL-A, which may comprise a unique identifier of the access point, to announce its presence. By detecting such a downlink advertisement DL-A from a neighbor access point AP2 rather than the currently associated access point AP1, the end point EP1 can send a report REP to the currently associated access point AP1 about the presence of the neighbor access point AP2. The associated access point AP1 will forward the report REP to the subsystem 500. With the end point and/or a further end point roaming through the area, the subsystem 500 can build up over time a good overview of the neighbor relationships among the plurality of access points. The subsystem 500 may be comprised in a standalone controller, such as a Li-Fi controller or a central controller 13 in the system. The connection between the subsystem and the plurality of access points is a backbone connection 21, which is a stable and high-speed link and in certain scenarios may even be an always-connected link. The backbone connection can be a wired connection, such as Ethernet, or a wireless connection based on radio frequency (RF) or millimeter-wave. The backbone connection can also be another kind of optical wireless link that is different from the one that an end point is performing in the optical multi-cell wireless network. Such an example can be free space optical communication.

Figure 9:
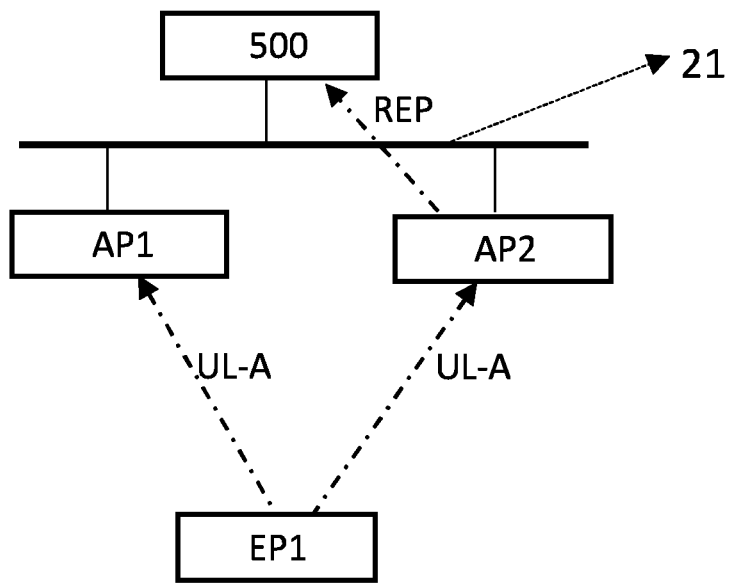
FIG. 9 illustrates the exchange of messages for building up neighbor relationships in a centralized subsystem via an uplink advertisement from the end point.

FIG. 9 illustrates the exchange of messages for building up the one or more neighbor relationships in a centralized subsystem 500 via an uplink advertisement from the end point. In this setup, the end point EP1 is configured to send out an uplink advertisement UL-A, which may comprise a unique identifier of the end point, to announce its presence. Such an uplink advertisement UL-A is detected by both the currently associated access point AP1 and a neighbor access point AP2 that is also located in the coverage area of the optical uplink from the end point EP1. Thus, the neighbor access point AP2 will recognize from the received uplink advertisement UL-A that the end point is not associated to itself and will send a report REP to the subsystem 500 directly related to this detection. With the report REP from the neighbor access point AP2 and the knowledge on the association between that end point EP1 and its currently associated access point AP1, a neighbor relationship can be derived by the subsystem 500 with regard to the neighbor access point AP2 and the currently associated access point AP1 of that end point EP1. With one or more end points roaming through the area, the subsystem 500 can build over time a good overview of the neighbor relationships based on the uplink advertisements of the one or more end points.

Figure 10:
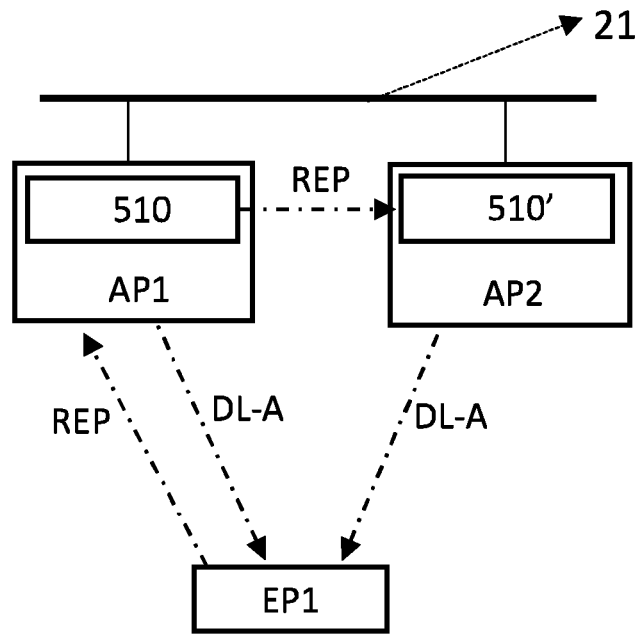
FIG. 10 illustrates the exchange of messages for building up neighbor relationships in a distributed subsystem via a downlink advertisement from the plurality of access points.
Figure 11:
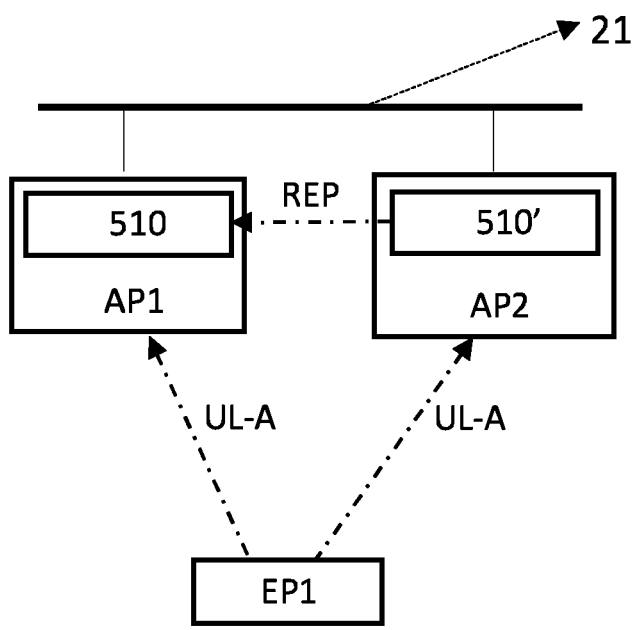
FIG. 11 illustrates the exchange of messages for building up neighbor relationships in a distributed subsystem via an uplink advertisement from the end point.

In another setup, a distributed subsystem 510, 510' is adopted for a relatively small-scale optical multi-cell wireless network 100. FIG. 10 and FIG. 11 illustrate the exchange of messages for building up neighbor relationships in the distributed subsystem 510, 510' via a downlink advertisement DL-A from the plurality of access points or an uplink advertisement UL-A from the end point respectively. The distributed subsystem 510, 510' may be comprised in more than one access points 120. For the ease of explanation, FIG. 10 and FIG. 11 show the examples that parts of the distributed subsystem 510, 510' are comprised in the currently associated access point AP1 and the neighbor access point AP2 respectively. It can also be the case that the distributed subsystem is comprised in more than one access points out of the plurality of access points, other than AP1 and AP2. The plurality of access points may be connected to one another via a backbone connection 21, which can be either wired (Ethernet) or wireless.

In FIG. 10, the currently associated access point AP1 receives the report REP from the associated end point EP1 about the presence of a neighbor access point AP2, and then it will forward the report REP to the distributed subsystem 510 and 510'. In this example, part of the distributed subsystem 510 is co-located with AP1, and the other part of the distributed subsystem 510' is reachable via e.g. a backbone connection 21. Neighboring APs may also be connected via free space optical communication.

Similarly, in FIG. 11, the neighbor access point AP2 receives the uplink advertisement UL-A from an end point EP1 that is not associated to itself. AP2 will send a report REP to the distributed subsystem 510, 510'. Here, part of the distributed subsystem 510' is co-located with AP2, and the other part of the distributed subsystem 510 is reachable via a backbone connection 21.

With the overview of the one or more neighbor relationships among the plurality of access points 120 in the network, the subsystem 510, 510, 510' may select one or more adjacent access points as the candidate access point for the end point. However, the selection can be further improved by considering additional information, which can be a floor plan of an area and the locations of the access points in that area, statistics on a handover history of the currently associated access point, or a combination of both.

Figure 12:
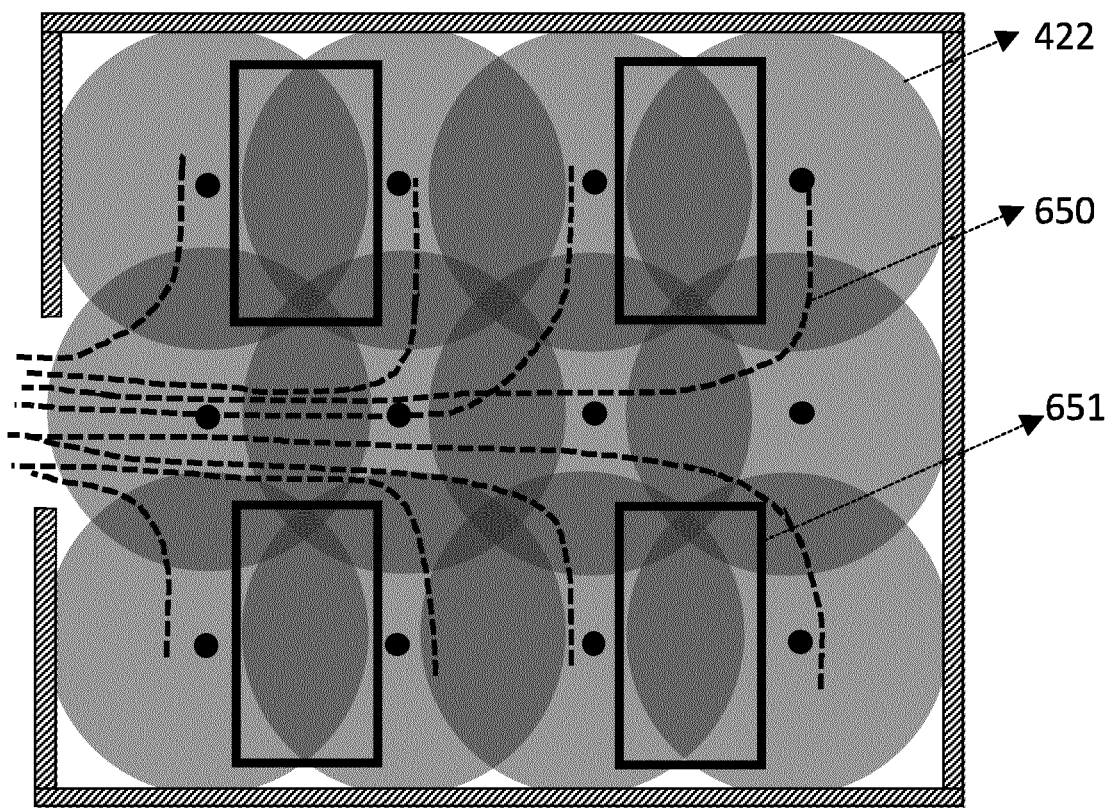
FIG. 12 demonstrates a floor plan of a room with multiple access points deployed in the area and the potential moving trajectories of a roaming end point.

FIG. 12 demonstrates a floor plan of a room with multiple access points deployed in the area and the potential moving trajectories 650 of a roaming end point. The strips with pattern fill represent the boundaries of the room, with the opening indicating the entrance to the room. The rectangular blocks 651 represent a few pieces of furniture in the room, which make certain moving trajectories less likely to happen. Sometimes two access points may be located next to each other on the ceiling, a potential handover from one access point to the other may be prevented due to a separation from a wall or a piece of furniture, such as a desk or a cupboard, which blocks the underneath moving path on the second planar surface 420. In the example of FIG. 12, it can be seen that the potential moving trajectories 650 represented with dash lines are rooted at the entrance to the room. The middle part of the room extending from the entrance is a kind of corridor inside the room, which is also the most visited parts of the room. The access points located on the ceiling of the corridor may also indicate several potential handovers. Therefore, using additional information according to a floor plan may help to make the selection of one or more candidate access points more intelligent.

Preferably, the selection of the one or more candidate access points can be further improved by considering statistics on a handover history of the currently associated access point, which may represent a probability distribution of previous handovers from the access point of interest to any one of the adjacent access points. Because of the layout of the room, or moving behavior of the user, or some other factors, handovers between some of the two adjacent access points may happen more often than others. A higher probability of occurrence in the past may be indicative of a larger chance of a future handover event. Therefore, such statistics derived from handover history can be used to improve the accuracy of the selection on the one or more candidate access points by the subsystem. Furthermore, as the statistics may be updated over time, this enables the subsystem to have a self-learning capability and to adapt to changes in user behavior, in the system, in the environment, or in the network.

Considering the relatively small coverage of a single optical cell, it could be even more beneficial to anticipate several subsequent handovers, which comprise a potential handover from the currently associated access point to a direct neighbor, and also one or more subsequent (potential) handovers from the direct neighbor to a non-adjacent further neighbor and/or from the non-adjacent further neighbor to an even further access point. Therefore, by knowing the candidate access points of several potential subsequent handovers, the end point can pre-establish a couple of pairwise security keys or pairwise transient keys, each dedicated to a different potential access point, well ahead of time resulting in a more seamless handover experience without delays incurred by the security key provisioning.

Referring back to FIG. 12, when the end point just enters the room and is associated to the middle left access point that is most close to the entrance, three direct neighbors of the associated access point can be selected as candidate access points, by assuming that the end point will move left or right, and the user of the mobile end point may subsequently sit down at the desk, or to move forward in the corridor area. Typically, the moving speed of the end point is higher when it is in the corridor than when it dwells along the furniture. Therefore, it may also be beneficial to prepare the subsequent handovers to the two further access points in the corridor area, which are not the direct neighbor of the associated access point but are further non-adjacent neighbor of the associated access point. Such information may be derived according to a floor plan, and it may also be derived according to statistics on a handover history. For example, if the subsystem has a probability distribution of previous handovers from each one of the plurality of access points to any one of its adjacent access points, each time when a new subsequent access point is added, the probabilities of handovers from the new subsequent access point to its adjacent access points should be considered to make the decision on another further handover.

A statistical data model could be maintained in the form of a directed adjacency graph wherein the edge weights represent the transition-probabilities among APs over time. Considering that end devices that the end points are connected to or comprised in can be personal devices, such as mobile phones, a preferred solution determines such a statistical data model aggregated over all end points, as well as for each individual end point. The aggregated data may then be used for new or unknown devices in the system as this data already captures the limitations of the physical world; whereas the individual end device data, when sufficient data has been collected, may capture a specific end user's routing/behavior.

Figure 13:
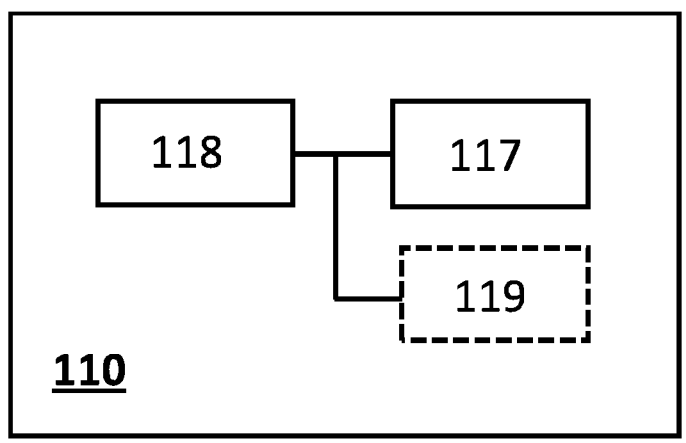
FIG. 13 schematically depicts basic components of an end point of the present invention.

FIG. 13 schematically depicts basic components of an end point of the present invention. The end point 110 comprises at least an optical transceiver 117 and a controller 118. The optical transceiver 117 should be understood as a complete Li-Fi transceiver that comprises at least an optical front end 111, an analog front end 112, a digital modulator/demodulator 113, and an interface 114 to an end device that the Li-Fi transceiver is connected to or comprised in. The controller 118 may be a dedicated controller or a controller shared with the end device. The end device may optionally comprise a user interface 119, which can provide users with added convenience of status inquiry or operation.

Figure 14:
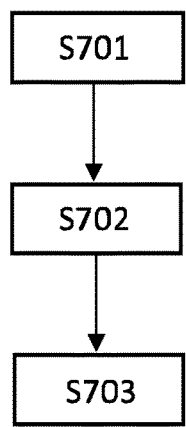
FIG. 14 shows a flow diagram of a method carried out by a subsystem.

FIG. 14 shows a flow diagram of a method 700 carried out by a subsystem 500, 510, 510' for supporting an end point 110 to carry out a secure handover from an access point currently associated with the end point 110 to another access point out of a plurality of access points 120 in an optical multi-cell wireless communication network 100. The method 700 comprises the following steps of the subsystem 500, 510, 510': in step S701, the subsystem 500, 510, 510' obtains neighbor relationship among the plurality of access points 120; the subsystem 500, 510, 510' selects, in step S702 for the end point 110 a candidate access point out of the plurality of access points 120, other than the currently associated access point, for a secure handover of the end point 110, in view of the obtained neighbor relationship; and then in step S703, the subsystem 500, 510, 510' informs the end point 110 via the currently associated access point about the candidate access point to trigger the end point 110 to start a procedure for pre-establishing a new pairwise transient key between the end point 110 and the candidate access point for the secure handover.

Figure 15:
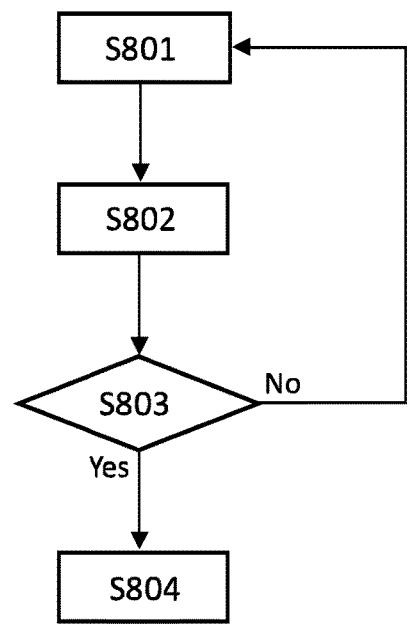
FIG. 15 shows a flow diagram of a method carried out by an end point.

FIG. 15 shows a flow diagram of a method 800 carried out by an end point 110 for performing a secure handover from an access point 120 currently associated with the end point 110 to another access point out of a plurality of access points 120 in the optical multi-cell wireless communication network 100. The method 800 comprises the following steps of the end point 110: in step S801, the end point 110 performs optical wireless communication with the currently associated access point; in step S802, the end point secures an optical wireless communication link with the currently associated access point by using a pairwise transient key to encrypt or decrypt data communicated on the link; and then, upon detection of information related to the candidate access point in step S803, the end point 110, in step S804, triggers a procedure for pre-establishing a new pairwise transient key between the end point 110 and a candidate access point for a secure handover, and wherein the procedure is triggered before the secure handover to the candidate access point actually takes place.

The methods according to the invention may be implemented on a computer as a computer implemented method, or in dedicated hardware, or in a combination of both.

Executable code for a method according to the invention may be stored on computer/machine readable storage means. Examples of computer/machine readable storage means include non-volatile memory devices, optical storage medium/devices, solid-state media, integrated circuits, servers, etc. Preferably, the computer program product comprises non-transitory program code means stored on a computer readable medium for performing a method according to the invention when said program product is executed on a computer.

Methods, systems and computer-readable media (transitory and non-transitory) may also be provided to implement selected aspects of the above-described embodiments.

The term "controller" is used herein generally to describe various apparatus relating to, among other functions, the operation of one or more network devices or coordinators. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, compact disks, optical disks, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network.

The invention claimed is:

1. A system for supporting an end point to carry out a secure handover from an access point currently associated with the end point to another access point out of a plurality of access points in an optical multi-cell wireless communication network, the system comprising:
    a subsystem configured to:
    obtain one or more neighbor relationships among the plurality of access points;
    select for the end point a candidate access point out of the plurality of access points, other than the currently associated access point, for a secure handover of the end point, in view of the obtained one or more neighbor relationships; and
    inform the end point via the currently associated access point about the candidate access point to trigger the end point to start a procedure for pre-establishing a new pairwise transient key between the end point and the candidate access point for the secure handover;
    the end point comprising:
    an optical transceiver configured to perform optical wireless communication;
    a controller configured to:
    secure an optical wireless communication link with the currently associated access point by using a pairwise transient key to encrypt or decrypt data communicated on the link;
    trigger the procedure for pre-establishing the new pairwise transient key between the end point and the candidate access point; for a secure handover, upon reception of information related to the candidate access point by the optical transceiver; and wherein the procedure is triggered before the handover to the candidate access point actually takes place; and
        the plurality of access points, comprising the currently associated access point and the candidate access point, configured to perform optical wireless communication with the end point and to connect with one another via a backbone connection;
    and wherein the subsystem is either comprised in one or more access points out of the plurality of access points or is connected to the plurality of access points via a backbone connection.

2. A subsystem for supporting an end point to carry out a secure handover from an access point currently associated with the end point to another access point out of a plurality of access points in an optical multi-cell wireless communication network, the subsystem being configured to:
    obtain one or more neighbor relationships among the plurality of access points;
    select for the end point a candidate access point out of the plurality of access points, other than the currently associated access point, for a secure handover of the end point, in view of the obtained one or more neighbor relationships; and
    inform the end point via the currently associated access point about the candidate access point to trigger the end point to start a procedure for pre-establishing a new pairwise transient key between the end point and the candidate access point for the secure handover.

3. The subsystem of claim 2, the subsystem is a centralized subsystem comprised in a central controller, and wherein the central controller is configured to communicate with the plurality of access points via backbone connections.

4. The subsystem of claim 2, the subsystem is a distributed subsystem comprised in one or more access points out of the plurality of access points, and wherein the plurality of access points are configured to communicate with one another via backbone connections.

5. The subsystem of claim 2, wherein a neighbor relationship of the one or more neighbor relationships is obtained by detection of a downlink advertisement from a neighbor access point other than an associated access point, by the end point and/or a further end point residing in an overlapping area of the respective neighboring access point and the respective associated access point, and wherein the detection is reported to the subsystem via the respective associated access point.

6. The subsystem of claim 2, wherein a neighbor relationship of the one or more neighbor relationships is obtained by detection of an uplink advertisement from the end point and/or a further end point by a further access point out of the plurality of access points, and wherein the end point and/or the further end point are not associated with the further access point, and wherein the detection by the further access point is reported to the subsystem.

7. The subsystem of claim 2, wherein the candidate access point is selected by considering a floor plan providing a layout of an area where the plurality of access points are located and spatial locations of the plurality of access points in the area.

8. The subsystem of claim 2, wherein the candidate access point is selected by considering statistics on handovers between the currently associated access point and other access points out of the plurality of access points.

9. The subsystem of claim 2, wherein more than one candidate access point is selected comprising at least a direct neighbor and a non-adjacent further neighbor of the currently associated access point, and wherein the non-adjacent further neighbor is adjacent to the direct neighbor.

10. An end point for performing a secure handover from an access point currently associated with the end point to another access point out of a plurality of access points in an optical multi-cell wireless communication network, the end point comprising:
   an optical transceiver configured to perform optical wireless communication;
   a controller configured:
      to secure an optical wireless communication link with the currently associated access point by using a pairwise transient key to encrypt or decrypt data communicated on the link; and
      to trigger a procedure for pre-establishing a new pairwise transient key between the end point and a candidate access point for a secure handover, upon reception of information related to the candidate access point by the optical transceiver; and wherein the procedure is triggered before the handover to the candidate access point actually takes place.

11. The end point of claim 10, wherein the optical transceiver is further configured to send a report to the currently associated access point upon detection of a downlink advertisement from a neighbor access point other than the currently associated access point.

12. The end point of claim 10, wherein the optical transceiver is further configured to send an uplink advertisement about the presence of the end point.

13. A method of a subsystem for supporting an end point to carry out a secure handover from an access point currently associated with the end point to another access point out of a plurality of access points in an optical multi-cell wireless communication network,
   the method comprising the steps of the subsystem:
      obtaining neighbor relationship among the plurality of access points;
      selecting for the end point a candidate access point out of the plurality of access points, other than the currently associated access point, for a secure handover of the end point, in view of the obtained neighbor relationship; and
      informing the end point via the currently associated access point about the candidate access point to trigger the end point to start a procedure for pre-establishing a new pairwise transient key between the end point and the candidate access point for the secure handover.

14. A method of an end point for performing a secure handover from an access point currently associated with the end point to another access point out of a plurality of access points in an optical multi-cell wireless communication network, the method comprising the steps of the end point:
   performing optical wireless communication with the currently associated access point;
   securing an optical wireless communication link with the currently associated access point by using a pairwise transient key to encrypt or decrypt data communicated on the link;
   triggering a procedure for pre-establishing a new pairwise transient key between the end point and a candidate access point for a secure handover, upon detection of information related to the candidate access point, and wherein the procedure is triggered before the secure handover to the candidate access point actually takes place.

15. A non-transitory computer readable medium comprising instructions which, when the instructions are executed by a processor of a subsystem or an end point, cause the processor to perform the method of claim 13.

* * * * *